R. F. TAYLOR.
WRENCH.
APPLICATION FILED MAY 15, 1911.
1,007,819.
Patented Nov. 7, 1911.
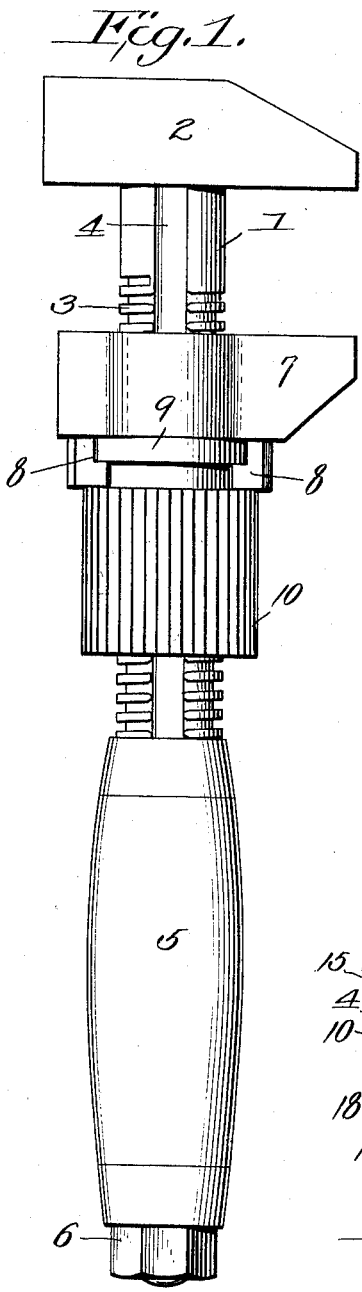
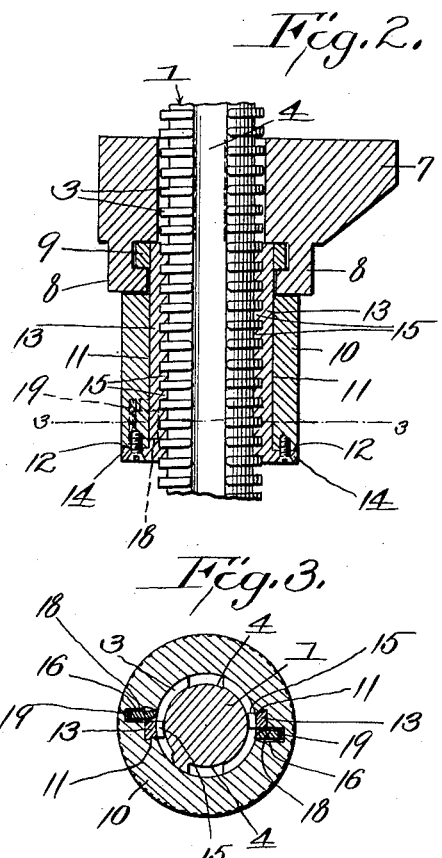
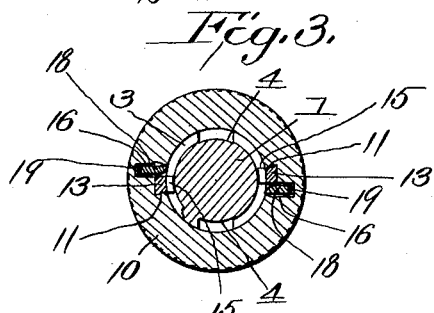
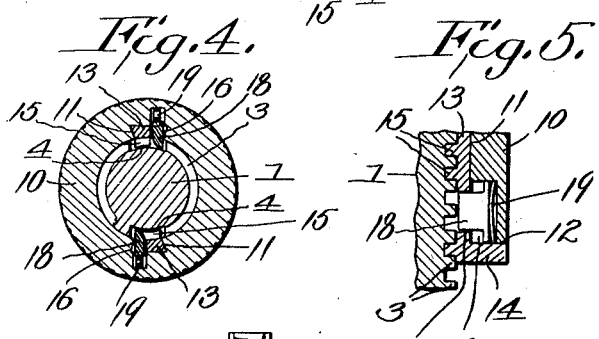
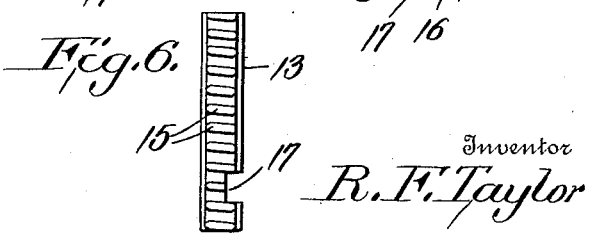
Inventor
R. F. Taylor
Witnesses
By Chas E Brock
Attorney
COLUMBIA PLANOGRAPH CO., WASHINGTON, D. C.

UNITED STATES PATENT OFFICE.

ROBERT F. TAYLOR, OF AMERICAN FALLS, IDAHO.

WRENCH.

1,007,819. Specification of Letters Patent. Patented Nov. 7, 1911.

Application filed May 15, 1911. Serial No. 627,148.

*To all whom it may concern:*

Be it known that I, ROBERT F. TAYLOR, a citizen of the United States, residing at American Falls, in the county of Oneida and State of Idaho, have invented a new and useful Improvement in Wrenches, of which the following is a specification.

This invention relates to a wrench provided with a fixed and a slidable jaw, and the object of the invention is to provide a wrench having a threaded shank provided with longitudinal grooves and a sleeve loosely connected to the slidable jaw and rotating upon said shank, said sleeve being provided with detachable teeth for engagement with the treads of the shank and also being provided with suitable locking mechanism which will permit the sleeve to rotate freely for the purpose of moving the slidable jaw toward the fixed jaw, but which will prevent a reverse rotation of the sleeve through more than one-half of a rotation, thereby automatically stopping such reverse rotation when the detachable teeth of the sleeve are brought into registry with the grooved or unthreaded portions of the shank.

The invention further consists in the novel features of construction hereinafter described, pointed out in the claims and shown in the accompanying drawings in which:

Figure 1 is a plan view of the wrench. Fig. 2 is a detail longitudinal section taken through the sleeve and slidable jaw, the shank being shown in elevation. Fig. 3 is a transverse section upon the line 3—3 of Fig. 2. Fig. 4 is a similar section the sleeve being rotated ninety degrees from the position shown in Fig. 3. Fig. 5 is a detail longitudinal section showing portions of the sleeve, the shank and the detachable teeth in section and certain locking means in side elevation. Fig. 6 is a detail view of a strip of the detachable teeth.

In the drawings 1 represents a cylindrical shank which carries at one end a fixed head or jaw 2, and which throughout a portion of its length is provided with spiral threads 3, said threads being interrupted upon opposite sides of the shank by longitudinal grooves 4. A suitable wooden handle 5 held upon the remaining portion of the shank and is held in place by a suitable nut 6. Slidably mounted upon the shank is a jaw 7 which is provided upon its rear face with angled lugs 8 which loosely grip a grooved collar 9 carried by a suitable sleeve 10. This sleeve is provided upon its interior with two longitudinal grooves 11, and is notched as shown at 12 upon its rear end, said notches communicating with the grooves 11. Strips 13 of steel or other hard metal fit in the grooves 11 and are provided with outwardly turned end portions 14 which fit into the slots 12 and are secured in place by suitable screws. These strips carry teeth 15 which are adapted to engage the threads 3 of the shank. To facilitate such engagement the ends of the threads are slightly rounded or beveled upon one side of the grooves 3 so that the teeth 15 will readily enter the spaces between the said threads when the jaw 7 has been moved into proper position. In order to permit ready rotation of the sleeve in a right handed direction to move the jaw 7 toward the slots 12 and at the same time in order to prevent reverse rotation after the teeth 15 have been brought into alinement with the grooves 3, I recess the sleeve as shown at 16 and the strips 13 as shown at 17 and fit loosely therein small ratchets or dogs 18 which are beveled upon one side so as to permit them to readily rise and ride over the threads when the sleeve is turned to the right. These dogs are pressed inwardly by small springs 19 and when they are brought into alinement with the grooves 3 during reverse rotation of the sleeve they fall into said groove and prevent further rotation in the direction of the sleeve. Further movement of the sliding jaw away from the fixed jaw is effected by simply sliding the sleeve and jaw along the shank, the teeth and dogs traveling in said grooves. By means of this construction I provide a wrench which is very closely adjusted, and by having the shank cylindrical a firm bearing is provided for the sleeve, and the entire wrench is strong and durable. By forming the teeth upon detachable strips it is not necessary to discard the entire sleeve upon the wiring of the teeth as new teeth can be readily fitted into position.

What I claim is:—

1. A wrench comprising a cylindrical shank, a fixed jaw, a slidable jaw, a rotatable sleeve loosely connected to the slidable jaw, the said shank having threads and being grooved upon opposite sides, strips of teeth detachably carried by the sleeve and adapted to engage said threads and also to slide in said grooves and locking means loosely carried by the sleeve, said locking means engaging the ends of the threads upon one side of said groove but riding over the ends of the threads upon the other side, as and for the purpose set forth.

2. In a wrench having a cylindrical threaded and grooved shank and having a fixed and a slidable jaw, a rotatable sleeve loosely connected to the slidable jaw, said sleeve being interiorly grooved, and notched at its rear end, strips fitting in said grooves and having outwardly turned end portions fitting in said notches, said strips being provided with teeth adapted to engage the threads of the shank, said threads having their ends beveled upon one side of the shank grooves, the strips and sleeve being provided with recesses, ratchets loosely held in said recesses, said ratchets being beveled upon the sides adjacent the beveled ends of the threads, and springs for forcing said ratchets inwardly, as and for the purpose set forth.

ROBERT F. TAYLOR.

Witnesses:
JOSEPH T. WATTS,
WM. A. VANCE.

---

Copies of this patent may be obtained for five cents each, by addressing the "Commissioner of Patents, Washington, D. C."